United States Patent
Terry et al.

(10) Patent No.: US 10,259,559 B2
(45) Date of Patent: Apr. 16, 2019

(54) REMOTELY-ACTIVATED SELF-CENTERING CABLE LATCH

(71) Applicant: The Boeing Company, Chicago, IL (US)

(72) Inventors: Troy N. Terry, Lake Stevens, WA (US); Jasen P. Schoales, Everett, WA (US)

(73) Assignee: The Boeing Company, Chicago, IL (US)

( * ) Notice: Subject to any disclaimer, the term of this patent is extended or adjusted under 35 U.S.C. 154(b) by 805 days.

(21) Appl. No.: 14/840,188

(22) Filed: Aug. 31, 2015

(65) Prior Publication Data
US 2017/0058561 A1   Mar. 2, 2017

(51) Int. Cl.
*E05B 15/02* (2006.01)
*E05C 3/16* (2006.01)
(Continued)

(52) U.S. Cl.
CPC .......... *B64C 1/1446* (2013.01); *E05B 15/022* (2013.01); *E05B 53/005* (2013.01);
(Continued)

(58) Field of Classification Search
CPC .... E05B 15/022; E05B 53/005; E05B 65/006; E05B 2015/023; E05B 2015/027; E05C 1/10; E05C 3/16; Y10T 292/0845; Y10T 292/0859; Y10T 292/0924; Y10T 292/0933; Y10T 292/0943; Y10T 292/0995; Y10T 292/106; Y10T 292/1071
See application file for complete search history.

(56) References Cited

U.S. PATENT DOCUMENTS

| 413,245 A | * | 10/1889 | Ricmond | ............ E05B 65/0864 |
| | | | | 292/175 |
| 1,585,314 A | * | 5/1926 | Pericle | .................... F16B 45/04 |
| | | | | 24/600.7 |

(Continued)

FOREIGN PATENT DOCUMENTS

| DE | 355458 C | * | 6/1922 | ............... E05C 1/10 |
| DE | 3408791 A1 | * | 9/1985 | ........... E05B 53/005 |

(Continued)

OTHER PUBLICATIONS

Pilgren, Rachel, AC Cables: The Connection Between Latching and Remote Actuation (http://blog.southca.com/ac-cables-connection-latching-remote-actuation-2/), printed from the World Wide Web on Aug. 27, 2015.

*Primary Examiner* — Carlos Lugo
(74) *Attorney, Agent, or Firm* — McDonnell Boehnen Hulbert & Berghoff LLP

(57) ABSTRACT

A hidden latch system for an interior structure of an aircraft includes at least two engagement features coupled to an interior structure of an aircraft. Each of the at least two engagement features includes an engagement portion, an engagement rod, and a self-centering feature. The engagement portion is configured to engage and release the engagement rod, and the self-centering feature is configured to self-center the engagement rod in at least one direction. Further, the engagement portion is configured to release the engagement rod using a cable pull system.

20 Claims, 10 Drawing Sheets

(51) Int. Cl.
*B64C 1/14* (2006.01)
*E05B 65/00* (2006.01)
*E05B 53/00* (2006.01)
*E05C 1/10* (2006.01)

(52) U.S. Cl.
CPC .............. *E05B 65/006* (2013.01); *E05C 1/10* (2013.01); *E05C 3/16* (2013.01); *E05B 2015/023* (2013.01); *E05B 2015/027* (2013.01)

(56) References Cited

U.S. PATENT DOCUMENTS

| | | | | |
|---|---|---|---|---|
| 1,748,875 | A * | 2/1930 | Fisher | E05B 83/24 |
| | | | | 292/DIG. 14 |
| 2,311,965 | A * | 2/1943 | Reynolds | E05B 83/247 |
| | | | | 16/326 |
| 2,572,730 | A * | 10/1951 | Jones | B60K 15/05 |
| | | | | 220/86.2 |
| 3,406,995 | A * | 10/1968 | McCarthy | E05D 7/1077 |
| | | | | 16/258 |
| 4,778,205 | A * | 10/1988 | Sayre | E05B 17/2088 |
| | | | | 292/171 |
| 4,799,631 | A | 1/1989 | Humphries et al. | |
| 4,902,051 | A * | 2/1990 | Poe | E05B 17/2088 |
| | | | | 292/127 |
| 5,020,835 | A * | 6/1991 | Poe | E05B 17/2088 |
| | | | | 292/106 |
| 5,826,672 | A * | 10/1998 | Holter | B62D 25/10 |
| | | | | 180/69.21 |
| 6,199,798 | B1 | 3/2001 | Stephan et al. | |
| 6,241,039 | B1 * | 6/2001 | Jarnstrom | E05B 15/022 |
| | | | | 180/69.21 |
| 6,536,710 | B1 | 3/2003 | Bobzien et al. | |
| 7,883,057 | B2 | 2/2011 | Lewis | |
| 8,656,677 | B2 | 2/2014 | Kernmayer et al. | |
| 8,733,807 | B2 * | 5/2014 | Williams | E05B 15/024 |
| | | | | 292/340 |
| 2011/0024565 | A1 | 2/2011 | Koefinger et al. | |
| 2011/0133027 | A1 | 6/2011 | Graeber et al. | |
| 2012/0145828 | A1 | 6/2012 | Grosse-Plankermann et al. | |

FOREIGN PATENT DOCUMENTS

| | | | | |
|---|---|---|---|---|
| DE | 102006049557 A1 | * | 4/2008 | ............... B60P 1/26 |
| EP | 3205799 A1 | * | 8/2017 | ........... E05C 19/022 |
| FR | 1472661 A | * | 3/1967 | ............. B60K 15/05 |
| GB | 849567 A | * | 9/1960 | ............... E05C 1/10 |

* cited by examiner

REMOTELY-ACTIVATED SELF-CENTERING CABLE LATCH

FIELD

The present disclosure relates to a latch system for an interior structure of an aircraft. More specifically, the present disclosure relates to a hidden latch system for a ceiling panel of an aircraft.

BACKGROUND

Unless otherwise indicated herein, the materials described in this section are not prior art to the claims and are not admitted to be prior art by inclusion in this section.

An aircraft typically includes a plurality of aircraft equipment inside an upper fuselage segment or crown portion of the aircraft, such as various systems, equipment, furnishings, and linings. These various systems, equipment, furnishings, and linings may include, for example, electrical equipment, wires, environmental control system (ECS) equipment and ducts, oxygen lines, water lines, power feeders, and other items. Typically, one or more secondary structures attached to the airframe provide support for these various systems, equipment, furnishings, and linings inside the crown portion of the aircraft.

Ceiling panels are typically a primary access point to the systems and equipment that run in the crown portion of the aircraft. Therefore, it is desirable for the ceiling panels to be installed in a manner that allows quick and simple methods of release, so that the systems and equipment that run in the crown portion of the aircraft may be accessed. This release is typically accomplished by employing some type of latch that can be released to remove the ceiling panel. Typically, the latch is hidden from view of passengers of the aircraft. However, the latch typically must be positioned in a location from which service personnel can manually access the latch in order to actuate the latch for release. Allowing for manual access to the latch release, however, creates design limitations on ceiling panels and often prevents designs that would improve the visual look of the ceiling panels. Additionally, current blind solutions for ceiling-attachment hardware typically use turn fasteners that require an access hole or other similar method. However, these current methods are often costly, unreliable, and difficult to certify for aircraft use.

There is, therefore, a need for a design that creates a simple and cost-effective method for attaching ceiling panels with hidden but accessible latches and that allows for more efficient and integrated designs.

BRIEF SUMMARY

According to an exemplary arrangement, a hidden latch system for an interior structure of an aircraft is presented. The hidden latch system includes at least two engagement features coupled to an interior structure of an aircraft. Each of the at least two engagement features includes an engagement portion, an engagement rod, and a self-centering feature. The engagement portion is configured to engage and release the engagement rod, and the self-centering feature is configured to self-center the engagement rod in at least one direction. Further, the engagement portion is configured to release the engagement rod using a cable pull system.

In another exemplary arrangement, a hidden latch for an interior structure of an aircraft is provided. The hidden latch includes an engagement feature coupled to an interior structure of an aircraft. The engagement feature includes an engagement portion, an engagement rod, and a self-centering feature. The engagement portion is configured to engage and release the engagement rod, and the self-centering feature is configured to self-center the engagement rod in at least one direction. Further, the engagement portion is configured to release the engagement rod using a cable pull system.

In another exemplary arrangement, a hidden latch system for an interior structure of an aircraft is provided. The hidden latch system includes at least two engagement features coupled to an interior structure of an aircraft. Each of the at least two engagement features includes an engagement portion and an engagement rod. During engagement of the engagement rod to the engagement portion, the engagement rod is configured for relative motion with respect to the engagement portion in an X direction and a Y direction. Further, the engagement portion is configured to engage and release the engagement rod, and the engagement portion is configured to release the engagement rod using a cable pull system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete, and will fully convey the scope of the disclosure to those skilled in the art.

The present disclosure provides for embodiments of a hidden latch system for an interior structure of an aircraft. The embodiments described herein are described primarily with reference to a ceiling panel of an aircraft. However, the embodiments of the systems and methods disclosed may be used in other systems as well. For instance, the disclosed embodiments may be used in aircraft, spacecraft, motor craft, watercraft, and other craft, as well as vehicles and other similar structures. Further, the disclosed embodiments may be used in other structures that may utilize a hidden latch system for supporting interior structures, such as buildings.

Figure 1:
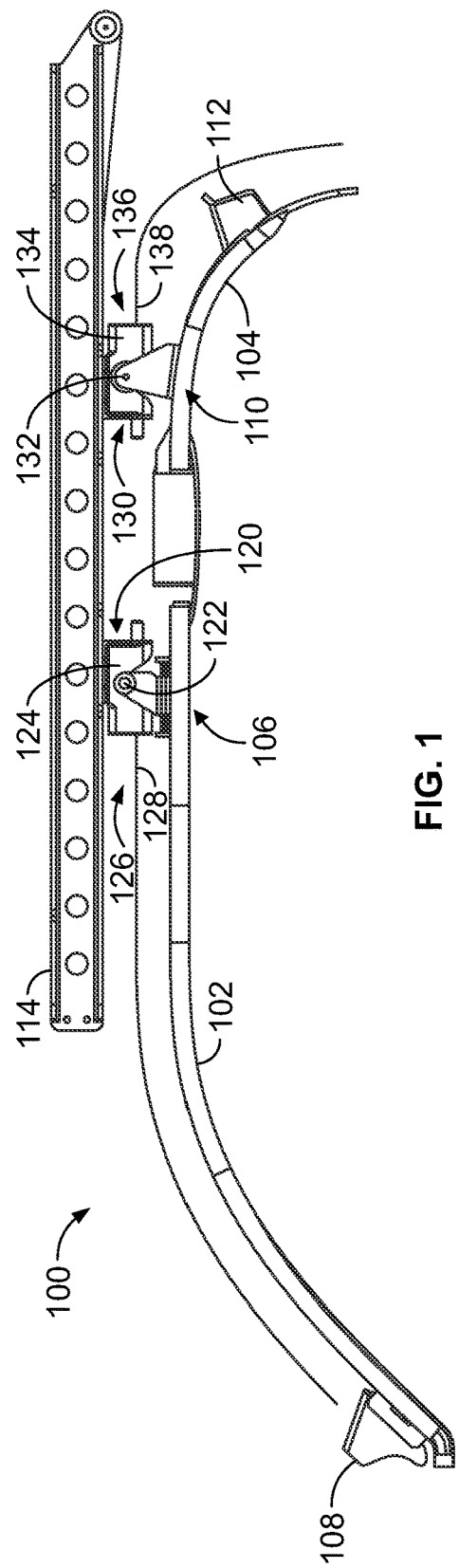
FIG. 1 is a diagrammatic representation of a front perspective view of a system having a plurality of interior structures each supported by a hidden latch system, in accordance with an exemplary embodiment.

FIG. 1 depicts a diagrammatic representation of a front perspective view of a system 100 having two interior structures, where each interior structure is supported by a hidden latch system, in accordance with an exemplary embodiment. In particular, system 100 includes a first ceiling panel 102 and a second ceiling panel 104. The ceiling panels 102 and 104 may be attached to a support structure or support structures in a crown of an aircraft by the hidden latch system. For instance, as shown in FIG. 1, ceiling panel 102 is coupled to hidden latch 106 and hidden attachment 108, and ceiling panel 104 is coupled to hidden latch 110 and hidden attachment 112. As used herein, the term "hidden" indicates that the latch or attachment is hidden or substantially hidden from view of a passenger of the aircraft when the ceiling panel is installed. Further, latches 106 and 110 may also be referred to herein as engagement features or self-centering engagement features. Still further, in an example embodiment, each ceiling panel 102, 104 may be attached to one or more additional hidden latches and hidden attachments as well.

In an example embodiment, the ceiling panels 102 and 104 are ceiling panels of a wide-body commercial aircraft, such as a Boeing 777. The latches 106 and 108 are shown attached to a lateral arm 114 of a crown integration panel (CIP). Further, attachments 108 and 112 may be attached to other support structures in the crown portion of the aircraft. For instance, attachment 108 may be attached to a center stowage bin in a wide-body commercial aircraft, and attachment 112 may be attached to an outboard stowage bin of a wide-body commercial aircraft.

Latch 106 includes an engagement portion 120, an engagement rod 122, and a self-centering feature 124. The engagement portion 120 is configured to engage and release the engagement rod 122. Further, the self-centering feature 124 is configured to self-center the engagement rod 122 in at least one direction. Still further, the engagement portion 120 is configured to release the engagement rod 122 using a cable pull system 126. Cable pull system 126 includes a cable 128 that may be used to release the engagement rod 122.

Similar to latch 106, latch 110 includes an engagement portion 130, an engagement rod 132, and a self-centering feature 134. The engagement portion 130 is configured to engage and release the engagement rod 132. Further, the self-centering feature 134 is configured to self-center the engagement rod 132 in at least one direction. Still further, the engagement portion 130 is configured to release the engagement rod 132 using a cable pull system 136. Cable pull system 136 includes a cable 138 that may be used to release the engagement rod 132.

Ceiling panels are typically a primary access point to the systems and equipment that run in the crown portion of the aircraft. Therefore, service personnel may occasionally need to uninstall ceiling panels 102 and 104 in order to access systems and equipment located above the ceiling panels 102 and 104. Cable pull systems 126 and 136 may be used to remotely release ceiling panels 102 and 104 from latches 106 and 110, respectively. For instance, cables 128 and 138 may each be routed from their respective engagement features to a remote location where the cable can be more easily accessed by service personnel.

Generally, the cables 128 and 138 may be placed in any desirable location where service personnel may access the cable. For instance, the cables 128 and 138 may be placed inside a luggage bin, at an edge of a ceiling panel, or at a gap between two ceiling panels. Other example remote locations are possible as well.

Figure 2:
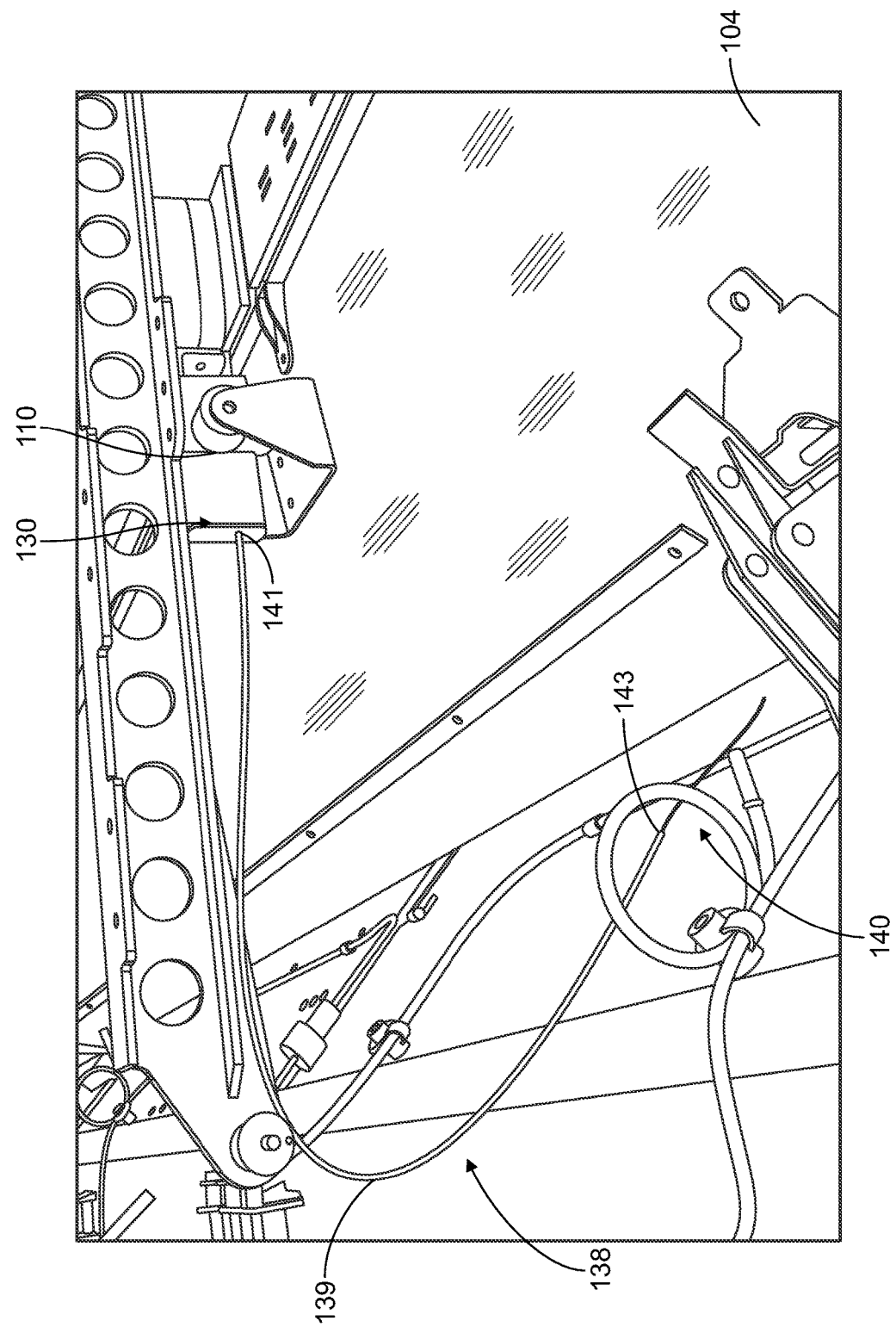
FIG. 2 is a diagrammatic representation of a perspective view of an engagement feature, in accordance with an exemplary embodiment.

As a particular example, FIG. 2 illustrates latch 110 where cable 138 is routed to a remote location 140. In particular, in the example of FIG. 2, cable 138 is routed to a bin strongback near a center of the ceiling panel 104 for access under a decompression seal. Such a location may be hidden from view of an aircraft passenger yet accessible by service personnel. Therefore, the remotely activated cable pull system 136 may provide a convenient way for service personnel to release the latch 110 and remove the ceiling panel 104 (e.g., in order to access systems and equipment located above the ceiling panel 104).

The remote location 140 to which the cable 138 is routed may be located a threshold distance away from the latch 110. For instance, the remote location may be at least one foot away from the latch 110. In other examples, the threshold distance between the engagement feature and the remote location may be greater than or less than one foot. Being able to activate the latch 110 from a remote location allows for the latch 110 to be located in any desired location.

In an example embodiment, cable 138 is a sheath-covered cable. A sheath such as sheath 139 may serve to protect the cable 138 and prevent any exposed moving parts. The sheath 139 also allows the cable 138 to be oriented at various angles and still be capable of being activated (e.g., pulled) to release the ceiling panel 104 from the engagement portion 130. An activation feature (such as a trigger) may be attached to an end of the cable so that service personnel can activate the cable to release the ceiling panel 104 from the engagement portion 130 using the activation feature. In an example embodiment, at least some portion or portions of the sheath are fixed. For instance, the sheath may be fixed at both ends. For example, sheath 139 is fixed at first end 141 and second end 143. Fixing the sheath 139 at both ends allows for mounting of the cable release in any position. The cable 138 is then able to move freely inside the sheath 139.

In addition to including a cable pull system that may be remotely activated to release the engagement feature, the disclosed engagement features also may include a self-centering feature that self-centers the engagement rod in at least one direction (e.g., along the X axis and/or the Y axis as defined in FIGS. 3a-6) during installation of the ceiling. Further, in an example embodiment, the engagement feature may also allow for movement of the ceiling panel in a given direction (e.g., along the Y axis) relative to the engagement rod during and after engagement of the engagement rod to the engagement portion.

Figure 3A:
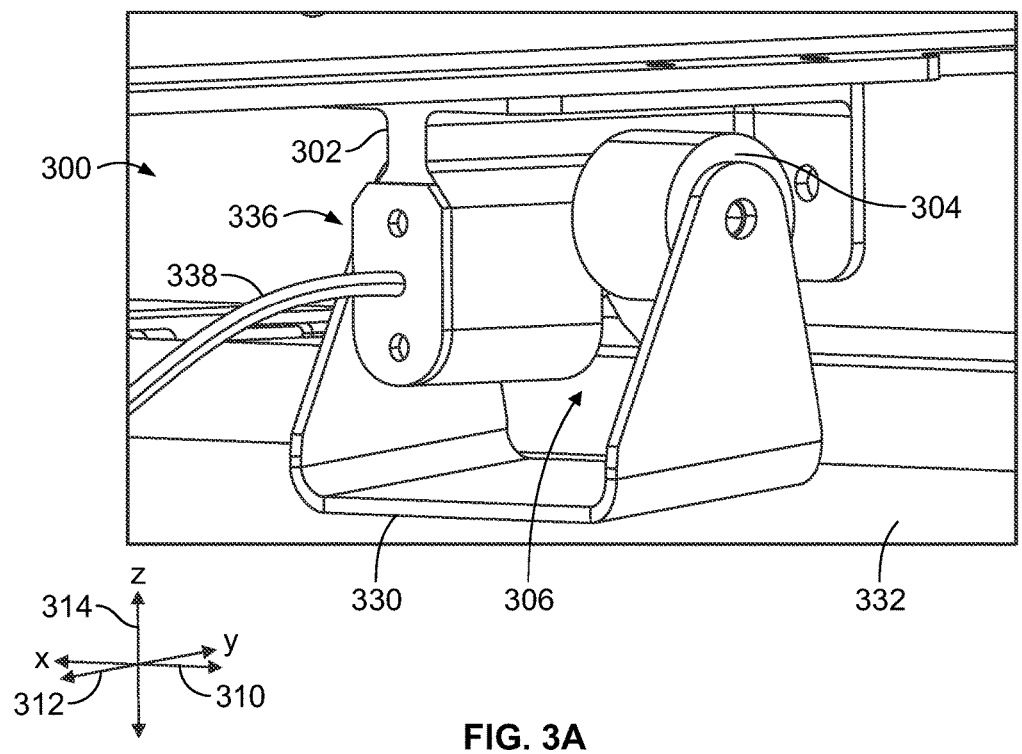
FIG. 3a is a diagrammatic representation of a perspective view of an engagement feature, in accordance with an exemplary embodiment.

Example embodiments of an engagement feature or latch in accordance with the present disclosure are described in further detail with reference to FIG. 3a through FIG. 6. FIG. 3a illustrates an example engagement feature 300 where the engagement rod is configured for self-centering in two directions during engagement to the engagement portion.

As shown in FIG. 3, engagement feature 300 includes an engagement portion 302, an engagement rod 304, and a self-centering feature 306. The engagement portion 302 is configured to engage and release the engagement rod 304. Further, the self-centering feature 306 is configured to self-center the engagement rod 304 in two directions. For orientation purposes, FIG. 3 depicts X axis 310, Y axis 312, and Z axis 314. In an example embodiment, motion along the X axis 310 corresponds to fwd/aft motion, motion along the Y axis 312 corresponds to lateral (inboard/outboard motion), and motion along Z axis 314 corresponds to up/down motion. The self-centering feature 306 is configured to self-center the engagement rod 304 along X axis 310 and Y axis 312 when the engagement rod 304 is engaged with engagement portion 302 during ceiling-panel installation.

Figure 3B:
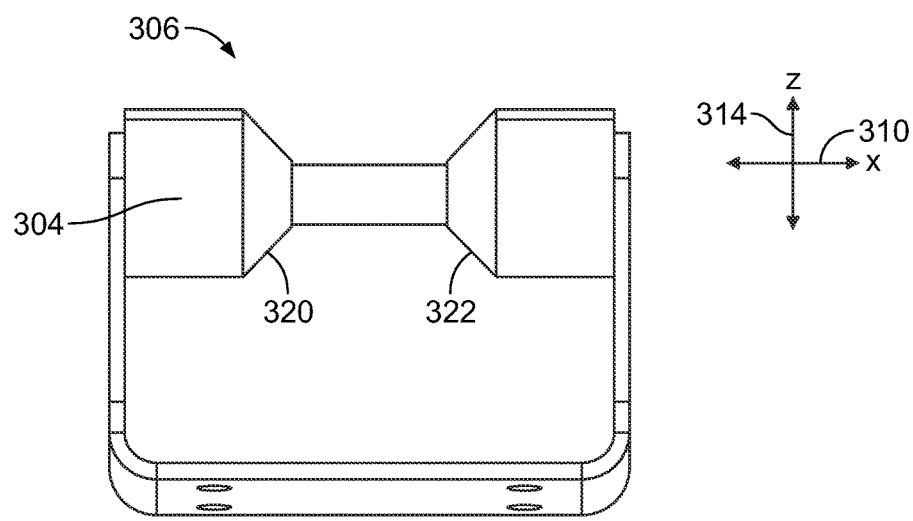
FIG. 3b is a diagrammatic representation of a front perspective view of an engagement rod of the engagement feature of FIG. 3a, in accordance with an exemplary embodiment.

As shown in FIG. 3b, the self-centering feature 306 includes edges that help to guide the engagement rod so as to self-center the engagement rod during engagement to the engagement portion such as tapered edges. In the example of FIG. 3b, the self-centering feature 306 includes frustoconically shaped portions 320, 322 on the engagement rod 304. These frustoconically shaped portions 320, 322 self-center the engagement rod 304 along X axis 310 during engagement to the engagement portion 302. In particular, as the engagement rod 304 moves along Z axis 314 during engagement to the engagement portion 302 (shown in FIG. 3c), the frustoconically shaped portions 320, 322 will interact with the engagement portion 302 so that engagement rod 304 self centers along X axis 310. Although self-centering feature 306 includes frustoconically shaped portions 320, 322 on the ends of engagement rod 304, other suitable shapes are possible as well. In an example embodiment, the edges of the engagement rod have a larger diameter on the ends of the engagement rod and a smaller diameter moving longitudinally from each end. The change in diameter may help to guide the engagement rod so as to self-center the engagement rod during engagement to the engagement portion.

Figure 3C:
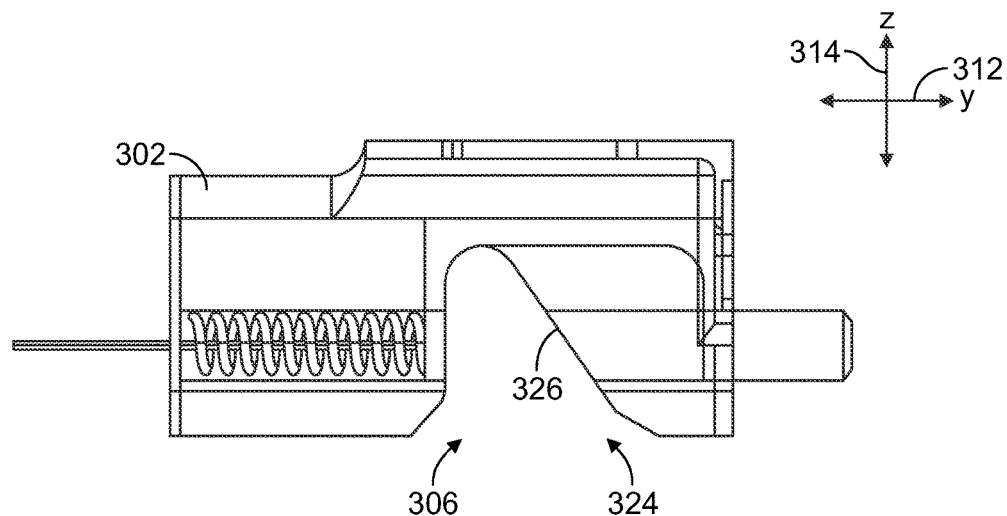
FIG. 3c is a diagrammatic representation of a side view of an engagement portion of the engagement feature of FIG. 3a, in accordance with an exemplary embodiment.

Further, as shown in FIG. 3c, the self-centering feature 306 also includes a cut-out 324 in the engagement portion configured to receive the engagement rod 304. This cut-out 324 includes a slanted portion 326 that self-centers the engagement rod along Y axis 312. In the example shown, slanted portion 326 is slanted at an angle of about 45 degrees from the Y axis 312. However, angles of a greater or lesser value are possible as well. In an example embodiment, the angle is between about 30 degrees and 60 degrees.

Returning to FIG. 3a, engagement feature 300 also includes a base 330 connected to the engagement rod 304. This base 330 is also connected to ceiling panel 332. In one embodiment, base 330 is a fixed to the ceiling panel 332, such that it prevents movement of the ceiling panel 332 relative to the engagement rod 304. Further, engagement feature 300 includes a cable pull system 336 having sheath-covered cable 338. In an example embodiment, the sheath of sheath-covered cable 338 is fixed at both ends of the sheath. This cable pull system 336 is configured to release engagement rod 304 from engagement with engagement portion 302.

Figure 4:
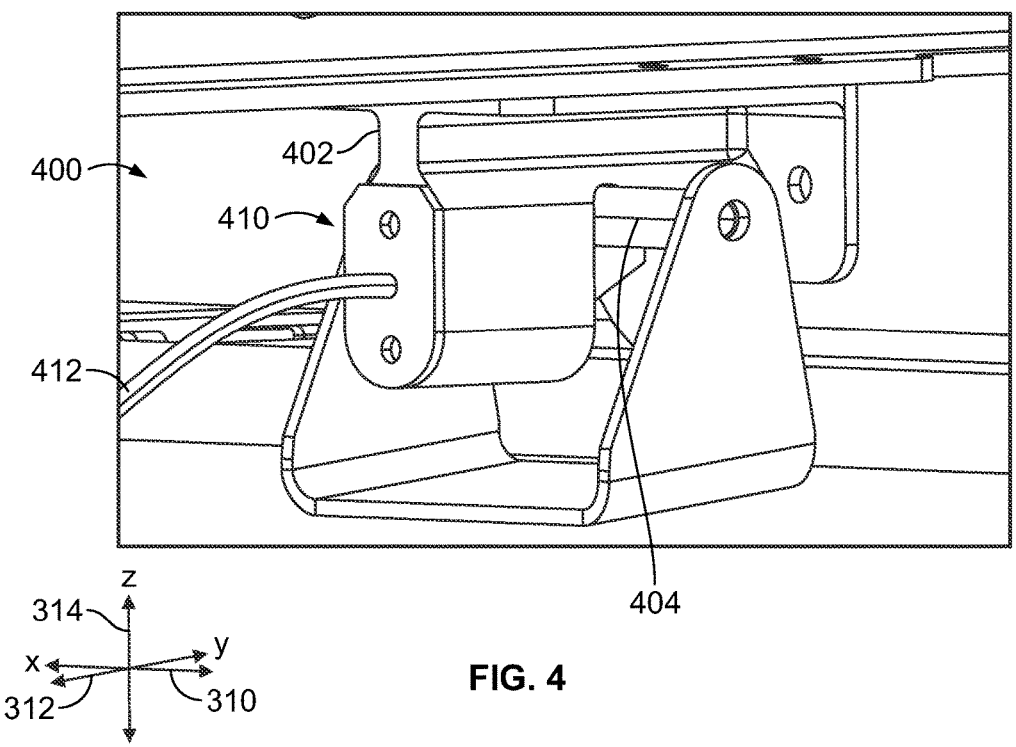
FIG. 4 is a diagrammatic representation of a perspective view of another engagement feature, in accordance with an exemplary embodiment.

In another example embodiment, the engagement feature may be configured to self-center the engagement rod in only one direction (e.g., along the Y axis but not along the X axis). In such an example embodiment, rather than self-centering the engagement rod along the X axis, the engagement feature may allow the engagement rod to float or move along the X axis. For instance, FIG. 4 illustrates an example engagement feature 400 that allow the engagement rod to float or move in one direction, relative to the engagement portion, when the engagement rod is engaged with engagement portion. Engagement feature 400 is similar in many respects to engagement feature 300 and, thus, is not described in great detail.

As illustrated in FIG. 4, engagement feature 400 includes engagement portion 402 and engagement rod 404. Engagement rod 404 has a length that is greater than a width of the engagement portion 402. Thus, engagement rod 404 may move along X axis 310 when the engagement rod 404 engages engagement portion 402. In this example, the engagement rod 404 is a substantially straight rod throughout all or substantially all of its length, rather than being an engagement rod that has frustoconically shaped portions (such as engagement rod 304). Therefore, engagement rod 404 will not automatically self center along X axis 310 when the engagement rod 404 in engaged with engagement portion 402. Instead, the engagement rod 404 can float along X axis 310. However, engagement feature 400 is configured to self-center the engagement rod 404 along Y-axis 312.

Engagement feature 400 also includes a cable pull system 410 having sheath-covered cable 412. In an example embodiment, the sheath of sheath-covered cable 412 is fixed at both ends of the sheath. The cable pull system 410 is configured to release engagement rod 404 from engagement with engagement portion 402.

In the example embodiments depicted in FIGS. 3a-c and 4, the engagement features each include a fixed base that prevents the attached ceiling panel from moving relative to the engagement rod. However, in some embodiments, it may be desirable to allow the ceiling panel to move in a given direction (e.g., along the Y axis) relative to the engagement rod when the ceiling panel is installed. In order to allow such movement, the engagement feature may include a floating base.

Figure 5:
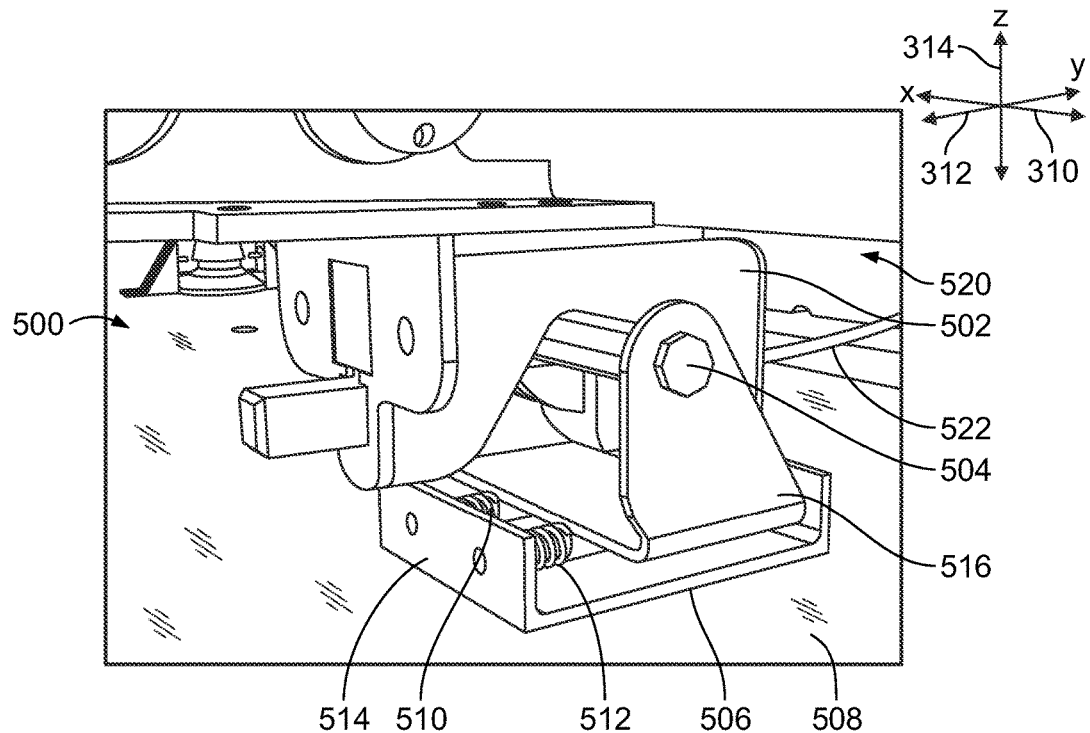
FIG. 5 is a diagrammatic representation of a perspective view of yet another engagement feature, in accordance with an exemplary embodiment.

FIG. 5 illustrates an example engagement feature 500 that includes a floating base. Engagement feature 500 is similar in many respects to the engagement features 300 and 400 and, thus, is not described in great detail. However, rather than having a fixed base connected to the engagement rod and the ceiling panel, engagement feature 500 includes a floating base.

As illustrated in FIG. 5, engagement feature 500 includes engagement portion 502 and engagement rod 504. Engagement rod 504 is connected to base 506, and base 506 is connected to ceiling panel 508. The floating base 506 may include at least one spring that allows the movement of the ceiling panel 508 relative to the engagement rod 504. For example, floating base 506 includes springs 510 and 512 connected to a first base portion 514, and first base portion 514 is connected to ceiling panel 508. Springs 510 and 512 are then connected to a second base portion 516, and second base portion 516 is connected to engagement rod 504. Springs 510 and 512 allow the second base portion 516 to move along Y axis 312 while the first base portion 514 remains fixed to ceiling panel 508. Therefore, ceiling panel 508 is able to move along Y axis 312 relative to engagement rod 504 both during and after attachment of engagement rod 504 to engagement portion 502.

This floating base 506 may help to improve the ceiling-panel installation process. The floating base 506 may allow the ceiling panel 508 to float relative to the engagement rod 504 so that the engagement rod 504 can properly align and self-center when the engagement rod 504 engages with the engagement portion 502. In an example embodiment, the floating base 506 allows the ceiling panel 508 to float about 0.5 inches along the Y axis 312 relative to the engagement rod. This float of about 0.5 inches may help during the installation process in order to account for build tolerances and to prevent (or reduce) the need to adjust a location at which the engagement rod is fixed to the ceiling panel or to adjust a location at which the engagement portion is attached to the support structure. In other example embodiments, the floating base may allow for a float of more or less than 0.5 inches.

Engagement feature 500 also includes a cable pull system 520 having sheath-covered cable 522. In an example embodiment, the sheath of sheath-covered cable 522 is fixed at both ends. The cable pull system 520 is configured to release engagement rod 504 from engagement with engagement portion 502. Further, the engagement rod 504 is substantially straight throughout its length and, thus, the engagement rod 504 is configured to float along X axis 310.

Figure 6:
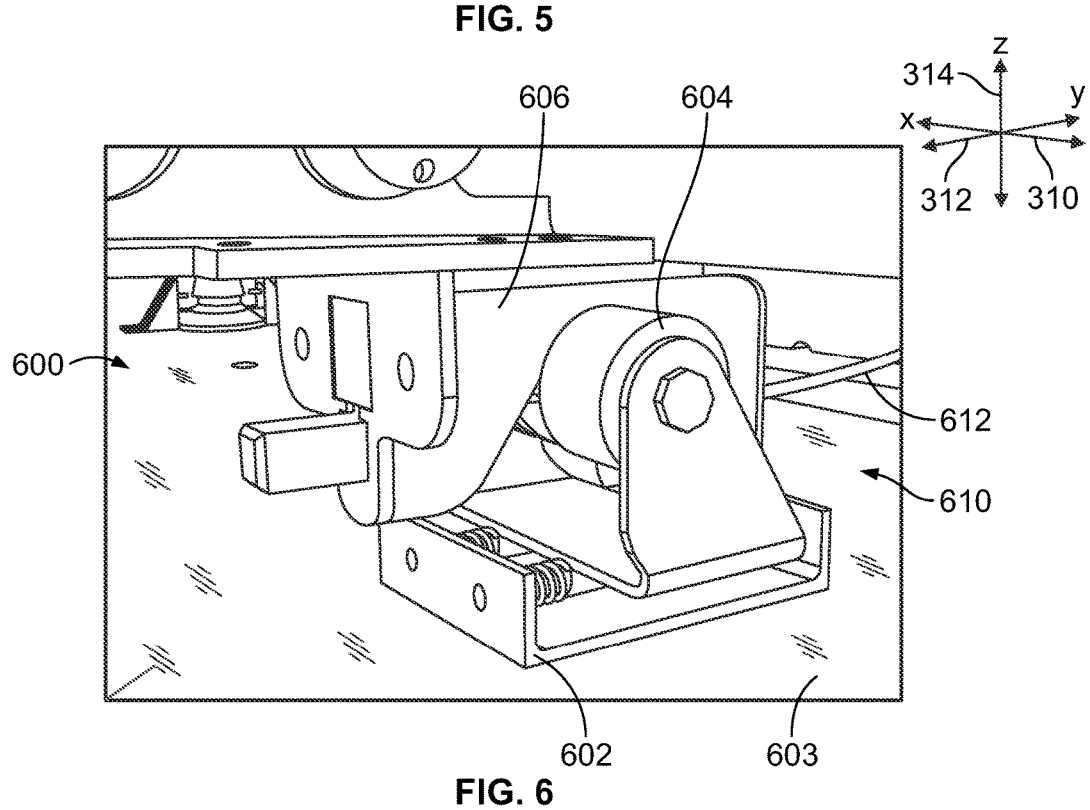
FIG. 6 is a diagrammatic representation of a perspective view of still yet another engagement feature, in accordance with an exemplary embodiment.

In another example, an engagement rod connected to a floating base could include frustoconically shaped portions so that the engagement rod may self-center along X axis 310. This example is depicted in FIG. 6. Engagement feature 600 is similar in many respects to engagement feature 300 and, thus, is not described in a great deal of detail. However, rather than having a fixed base, engagement feature 600 has a floating base 602 (which is similar in many respects to floating base 506 and, thus, is not described in a great deal of detail). The floating base 602 allows for movement of ceiling panel 603 relative to engagement rod 604 when engagement rod 604 is engaging with engagement portion 606. Further, when engagement rod 604 is engaged with engagement portion 606, engagement feature 600 prevents movement of the ceiling panel along X axis 310 but allows for movement of the ceiling panel along Y axis 312.

Engagement feature 600 also includes a cable pull system 610 having sheath-covered cable 612. In an example embodiment, the sheath of sheath-covered cable 612 is fixed at both ends of the sheath. This cable pull system 610 is configured to release engagement rod 604 from engagement with engagement portion 606.

The disclosed self-centering feature of the engagement feature helps allow for a blind installation of a ceiling panel. Further, the disclosed self-centering feature may also help to reduce time spent during the ceiling installation process. In an example, since the engagement rod and the engagement portion will automatically self align during the engagement process, the installer will not need to precisely line up the engagement rod with the engagement portion. In another example, an installer may avoid a need to adjust a location at which the engagement rod is fixed to the ceiling panel or to adjust a location at which the engagement portion is attached to the support structure. This may help to reduce time spent during the ceiling installation process compared to an installation process that uses existing latches or fixtures. Further, the disclosed engagement features allows a simple blind installation of ceiling panels for an aircraft without requiring access holes and/or special, customized tools for the installation.

In an example embodiment, a hidden latch system for attaching a ceiling panel to a support structure(s) of an aircraft may use two or more self-centering engagement features. In an example embodiment, engagement features 300 and 400 may be used in combination with one another to attach a ceiling panel to support structures in an aircraft. In another example embodiment, engagement features 500 and 600 may be used in combination with one another to attach a ceiling panel to support structures in an aircraft. Other combinations of the engagement features are possible as well.

Figure 7B:
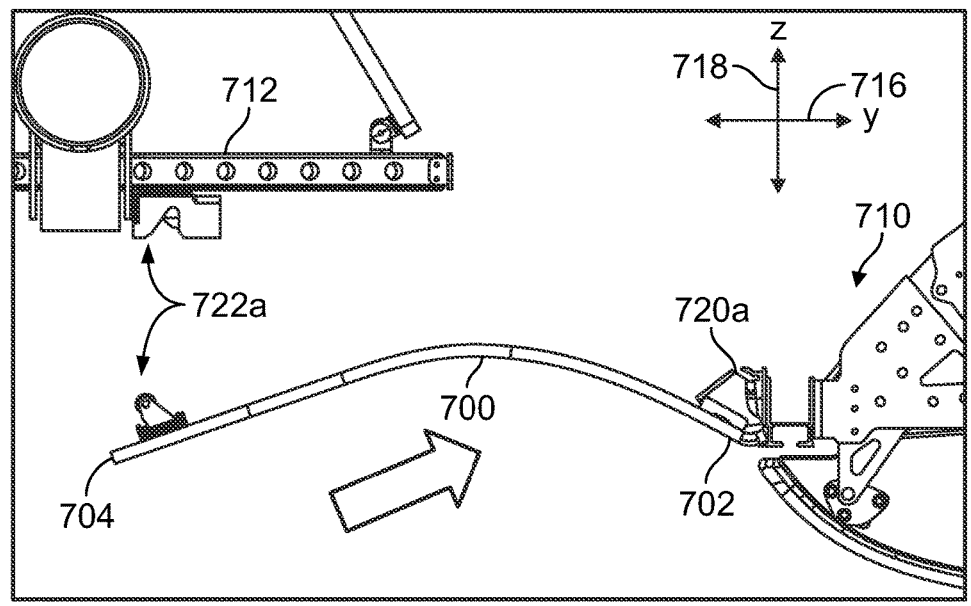
FIG. 7b is a diagrammatic representation of a front perspective view of a latch system of the ceiling panel of FIG. 7a, in accordance with an exemplary embodiment.
Figure 7C:
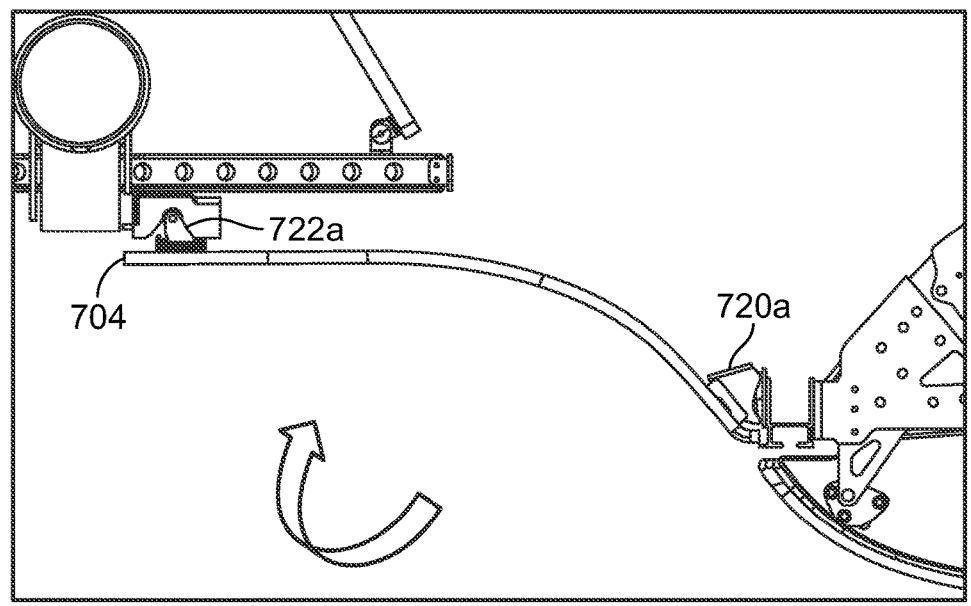
FIG. 7c is another diagrammatic representation of a front perspective view of the latch system of FIG. 7b.

Example hidden latch systems are described with reference to FIGS. 7a-c and 8a-c. In particular, FIGS. 7a-c depict an example inboard ceiling panel and hidden latch system for an inboard ceiling panel, and FIGS. 8a-c depict an example outboard ceiling panel and hidden latch system for an outboard ceiling panel.

Figure 7A:
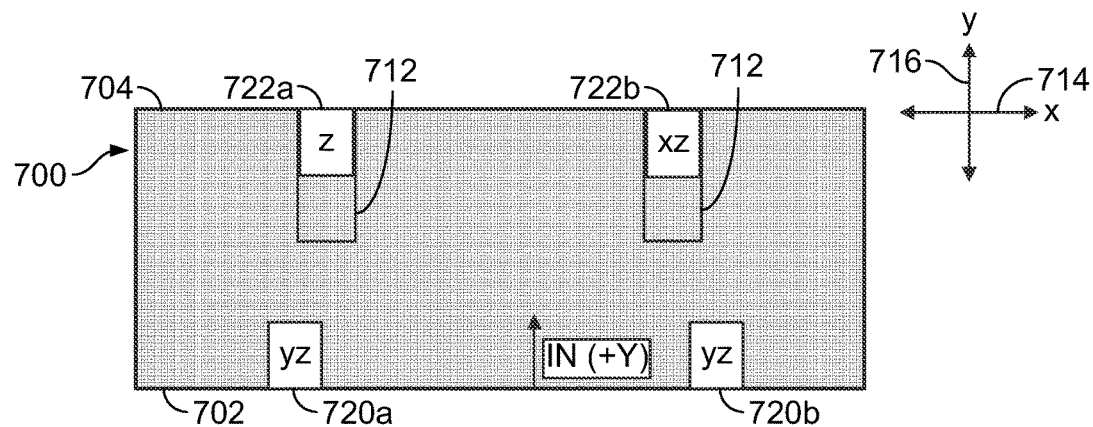
FIG. 7a is a diagrammatic representation of a ceiling panel, in accordance with an exemplary embodiment.
Figure 8A:
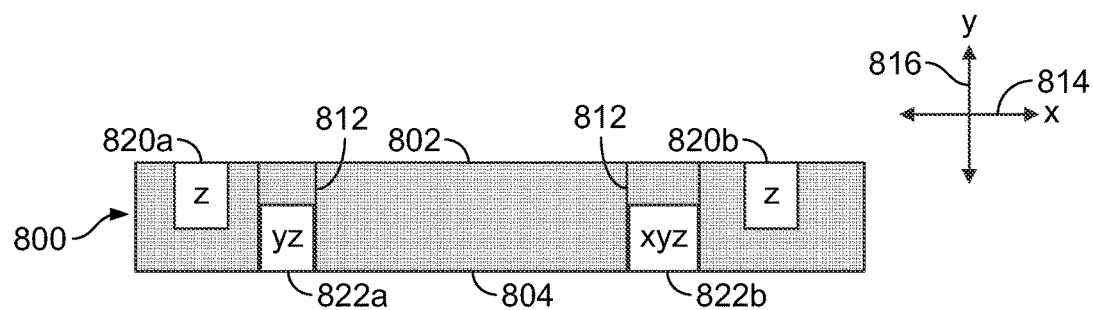
FIG. 8a is a diagrammatic representation of another ceiling panel, in accordance with an exemplary embodiment.
Figure 8B:
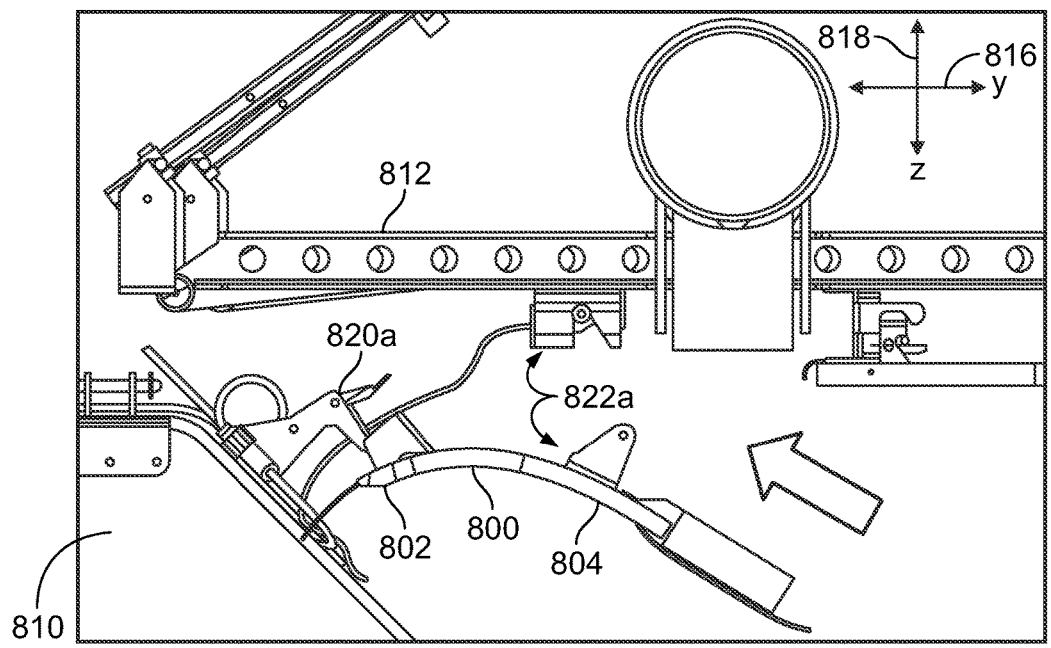
FIG. 8b is a diagrammatic representation of a front perspective view of a latch system of the ceiling panel of FIG. 8a, in accordance with an exemplary embodiment.
Figure 8C:
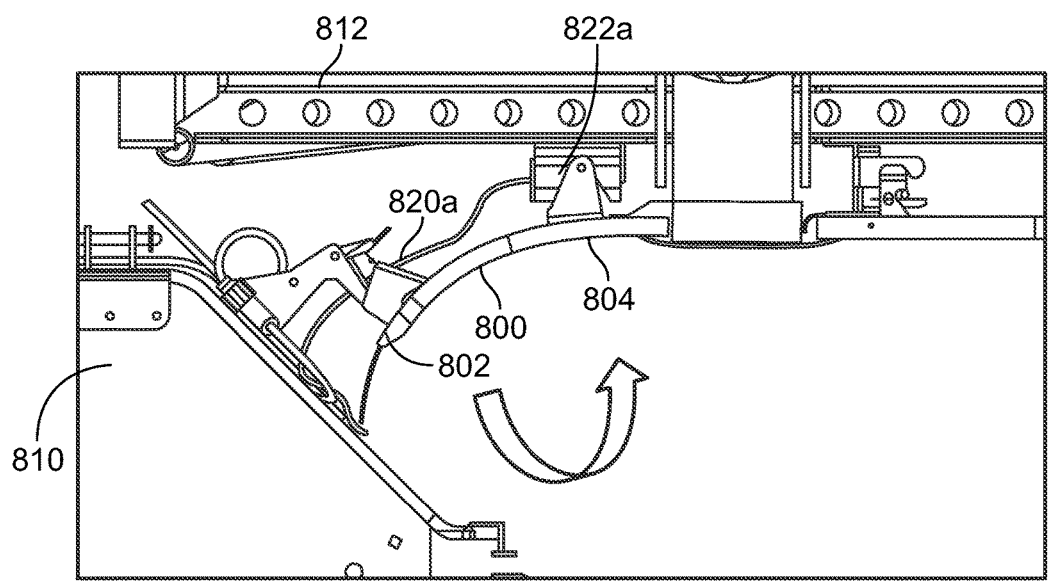
FIG. 8c is another diagrammatic representation of a front perspective view of the latch system of FIG. 8b.

FIG. 7a depicts an inboard ceiling panel 700 having a first end 702 and a second end 704. The first end 704 may be attached to a first support structure in the crown of the aircraft and the second end may be attached to a second support structure in the crown of the aircraft. In particular, with reference to FIG. 7b, first end 702 is attached to a stowage bin 710 and second end 704 is attached to one or more lateral arms 712 (see also FIG. 7a) of a CIP.

Figure 7D:
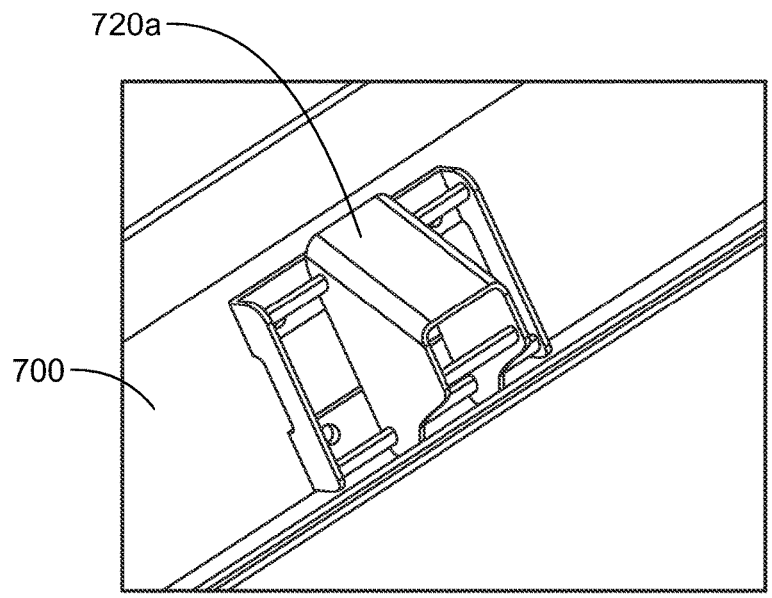
FIG. 7d is a diagrammatic representation of a front perspective view of an attachment of the latch system of FIG. 7b, in accordance with an exemplary embodiment.

As shown in FIG. 7a in combination with FIG. 7b, two engagement features are used to attach the ceiling panel 700 to the stowage bin 710, and two engagement features are used to attach the ceiling panel 700 to the lateral arms 712. In particular, the first end 702 is connected to the stowage bin 710 using attachments 720a (see FIGS. 7a-c) and 720b (see FIG. 7a). Attachments 720a and 720b may be ceiling panel attachments now known in the art or later developed. Attachment 720a is illustrated in FIG. 7d. This attachment 720a may allow the ceiling panel 700 to float in the X direction while being fixed in the Y direction and Z direction. Attachment 720b may be the same as attachment 720a.

Further, as shown in FIGS. 7a-c, the second end 704 is connected to the lateral arm 712 using engagement feature 722a. Still further, the second end 704 is connected to second lateral arm 712 (not shown in FIGS. 7b-c but shown in FIG. 7a) using engagement feature 722b (not shown in FIGS. 7b-c but shown in FIG. 7a). The second lateral arm 712 is the same or substantially the same as lateral arm 712. FIG. 7b depicts the ceiling panel 700 before the second end 704 is attached to lateral arm 712, and FIG. 7c depicts the ceiling panel after the second end 704 is attached to the lateral arm. In FIG. 7b, the engagement portion of engagement feature 722a is shown attached to the lateral arm 712, and the base and engagement rod of engagement feature 722a is shown attached to the ceiling panel 700.

In this example of FIGS. 7a-c, engagement feature 722a corresponds to engagement feature 500, and engagement feature 722b corresponds to engagement feature 600. When the second end 704 is connected to the lateral arms 712 using engagement features 722a and 722b, the self-centering features of the engagement features 722a and 722b operate to self-center the engagement rods in two directions (e.g., the X-direction and the Y-direction). For orientation purposes, FIG. 7a and FIG. 7b, together, set forth a coordinate system that depicts X axis 714, Y axis 716, and Z axis 718. In an example embodiment, motion along the X axis 714 corresponds to fwd/aft motion, motion along the Y axis 716 corresponds to lateral, inboard/outboard motion, and motion along Z axis 718 corresponds to up/down motion.

The engagement features of the hidden latch system may allow for movement in some directions while preventing movement in other directions. FIG. 7a illustrates the directions in which the various engagement features of the hidden latch system are fixed. In particular, attachments 720a and 720b are fixed in the Y direction and the Z direction. Further, as illustrated in FIG. 7a, engagement feature 722a is fixed in the Z direction, and engagement feature 722b is fixed in the X direction and the Z direction.

In order to attach ceiling panel 700 to the two support structures, the first end 702 is first connected to the stowage bin 710 using attachments 720a and 720b, as shown in FIG. 7b in combination with FIG. 7a. In order to attach second end 704 of ceiling panel 700 to lateral arms 712, second end 704 may then be moved along the Z axis 718 toward engagement features 722a and 722b, so that respective engagement rods of engagement features 722a and 722b engage with the respective engagement portions of engagement features 722a and 722b, as shown in FIG. 7c.

As mentioned above, engagement feature 722a corresponds to engagement feature 500, and engagement feature 722b corresponds to engagement feature 600. Therefore, as the engagement rod of engagements feature 722a interacts with the engagement portion of engagements feature 722a, the engagement rod will self center along Y axis 716. Further, as the engagement rod of engagement feature 722b interacts with the engagement portion of engagements feature 722b, the engagement rod will self center along both X axis 714 and Y axis 716. When the engagement rod of engagement feature 722b self-centers along the X axis 714, the engagement rod of engagement feature 722a may also move a corresponding amount along X axis 714.

In addition to allowing for relative motion during attachment of the ceiling panel 700, the engagement features may also allow for relative motion when the ceiling panel 700 is installed. For instance, after the ceiling panel 700 is attached to the plurality of engagement features, the engagement features may allow for movement of the ceiling panel 700 relative to the support structures to which the engagement features are attached. In particular, attachments 720a and 720b may allow the ceiling panel 700 to move in the X direction relative to stowage bin 710, while being fixed in the Y direction and Z direction. Further, engagement feature 722a may allow the ceiling panel 700 to move in the X direction and the Y direction relative to lateral arm 712, while being fixed in the Z direction. Still further, engagement feature 722b may allow the ceiling panel 700 to move in the Y direction relative to the second lateral arm 712, while being fixed in the X direction and the Z direction.

As another example, FIGS. 8a-8c depict an example outboard ceiling panel and hidden latch system for the outboard ceiling panel. In particular, FIG. 8a depicts an outboard ceiling panel 800 having a first end 802 and a second end 804. The first end 804 may be attached to a first support structure in the crown of the aircraft and the second end may be attached to a second support structure in the crown of the aircraft. In particular, with reference to FIG. 8b, first end 802 is attached to an outboard stowage bin 810 and second end 804 is attached to one or more lateral arms 812 of a CIP (see also FIG. 8a).

Figure 8D:
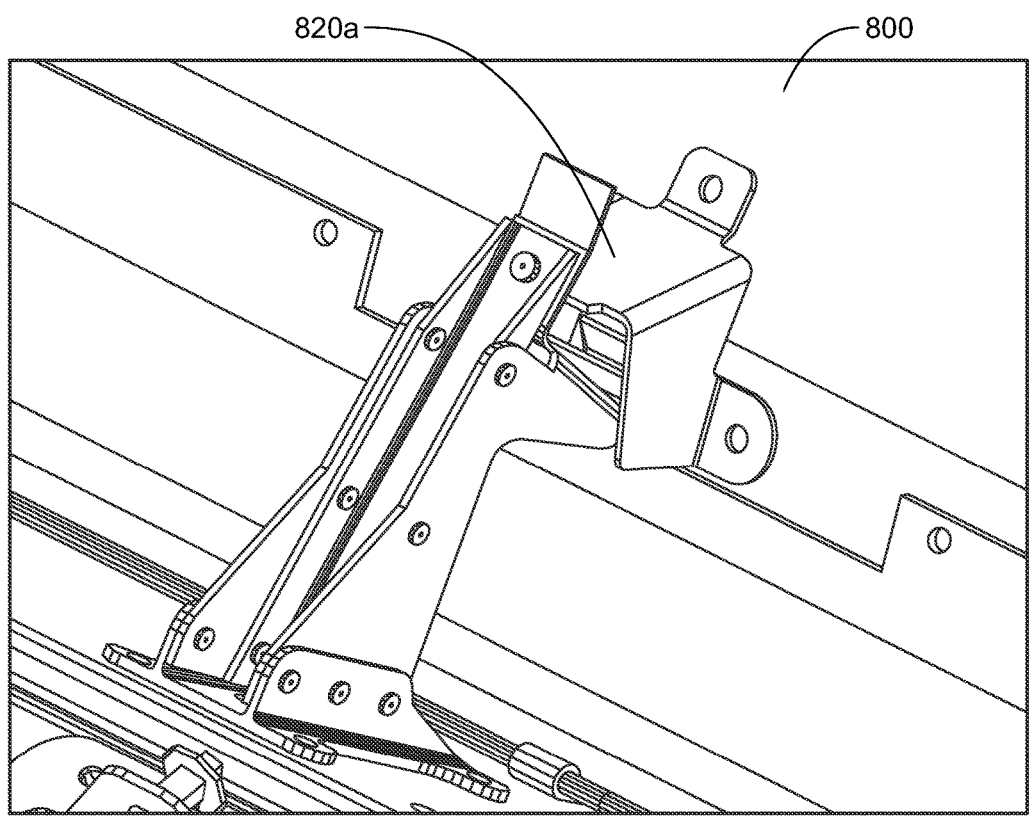
FIG. 8d is a diagrammatic representation of a front perspective view of an attachment of the latch system of FIG. 8b, in accordance with an exemplary embodiment.

As shown in FIG. 8a in combination with FIG. 8b, two engagement features are used to attach the ceiling panel 800 to the stowage bin 810, and two engagement features are used to attach the ceiling panel 800 to the lateral arms 812. In particular, the first end 802 is connected to the stowage bin 810 using attachments 820a (see FIGS. 8a-c) and 820b (see FIG. 8a). Attachments 820a and 820b may be ceiling panel attachments now known in the art or later developed. Attachment 820a is further illustrated in FIG. 8d. This attachment 820a may allow the ceiling panel to float in the X direction and Y direction relative to stowage bin 810 while being fixed in the Z direction. Attachment 820b may be the same as attachment 820a.

Further, the second end 804 is connected to the lateral arm 812 using engagement feature 822a (see FIGS. 8a and 8c). Still further, the second end 804 may be connected to a second lateral arm 812 (not shown in FIGS. 8b-c but shown in FIG. 8a) using engagement feature 822b (not shown in FIGS. 8b-c but shown in FIG. 8a). The second lateral arm 812 is the same or substantially the same as lateral arm 812. FIG. 8b depicts the ceiling panel 800 before the second end 804 is attached to lateral arm 812, and FIG. 8c depicts the ceiling panel 800 after the second end 804 is attached to the lateral arm 812. In FIG. 8b, the engagement portion of engagement feature 822a is shown attached to the lateral arm 812, and the base and engagement rod of engagement feature 822a is shown attached to the ceiling panel 800.

Engagement feature 822a corresponds to engagement feature 400, and engagement feature 822b corresponds to engagement feature 300. When the second end 804 is connected to the lateral arms 812 using engagement features 822a and 822b, the self-centering features of the engagement features 822a and 822b operate to self-center the engagement rods in two directions (e.g., the X-direction and the Y-direction). For orientation purposes, FIG. 8a and FIG. 8b, together, set forth a coordinate system that depicts X axis 814, Y axis 816, and Z axis 818. In an example embodiment, motion along the X axis 814 corresponds to fwd/aft motion, motion along the Y axis 816 corresponds to lateral (inboard/outboard) motion, and motion along Z axis 818 corresponds to up/down motion.

FIG. 8a illustrates the directions in which the various engagement features of the hidden latch system are fixed. In particular, attachments 820a and 820b are fixed in the Z direction. Further, engagement feature 822a is fixed in the Y direction and the Z direction, and engagement feature 822b is fixed in the X direction, the Y direction, and the Z direction.

In order to attach ceiling panel 800 to the two support structures, the first end 802 is first connected to the stowage bin 810 using attachments 820a and 820b, as shown in FIG. 8b. Second end 804 of ceiling panel 800 may then be moved along the Z axis 818 toward engagement features 822a and 822b, so that respective engagement rods of engagement features 822a and 822b engage with the respective engagement portions of engagement features 822a and 822b, as shown in FIG. 8c.

As mentioned above, engagement feature 822a corresponds to engagement feature 400, and engagement feature 822b corresponds to engagement feature 300. Therefore, as the engagement rod of engagements feature 822a interacts with the engagement portion of engagements feature 822a, the engagement rod will self center along Y axis 816. Further, as the engagement rod of engagement feature 822b interacts with the engagement portion of engagements feature 822b, the engagement rod will self center along both X axis 814 and Y axis 816.

After the ceiling panel 800 is attached to the plurality of engagement features, the engagement features may allow for movement of the ceiling panel 800 relative to the support structures to which the engagement features are attached. In particular, attachments 820a and 820b may allow the ceiling panel 800 to move in the X direction and the Y direction relative to stowage bin 810, while being fixed in the Z direction. Engagement feature 822a may allow the ceiling panel 800 to move in the X direction relative to lateral arm 812, while being fixed in the Y direction and the Z direction. Engagement feature 822b, on the other hand, may prevent movement of the ceiling panel 800 relative to the second lateral arm 812.

In the examples shown in FIGS. 7a-c and 8a-c, the inboard ceiling panel is coupled to two self-centering engagement features having a floating base, whereas the outboard ceiling panel is coupled to two self-centering engagement features that have a fixed base. However, other example combinations of the disclosed self-centering engagement features are possible as well. In general, a ceiling panel may be coupled to one or more self-centering engagement features that allow for the desired self-centering and relative movement. Further, in these example embodiments shown in FIGS. 7a-c and 8a-c, each ceiling panel is coupled to two self-centering engagement features. However, in other examples, the ceiling panel may be coupled to more or fewer self-centering engagement features. For example, the ceiling panel may be coupled to only one self-centering engagement feature. In another example, the ceiling panel may be coupled to three or more self-centering engagement feature.

Figure 9A:
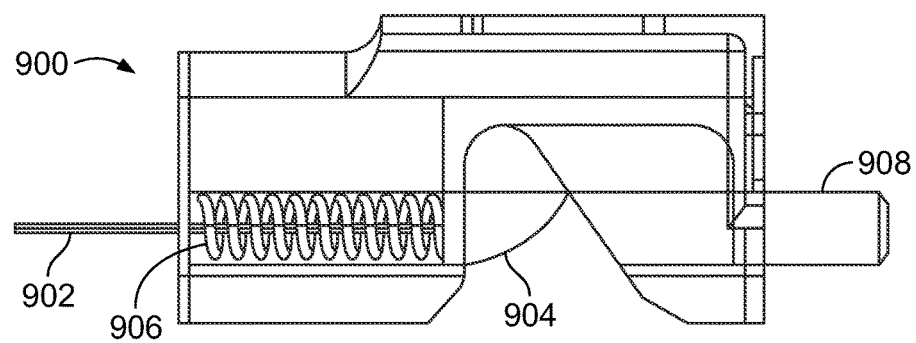
FIG. 9a is a diagrammatic representation of a front perspective view of an engagement portion of an engagement feature, in accordance with an exemplary embodiment.
Figure 9B:
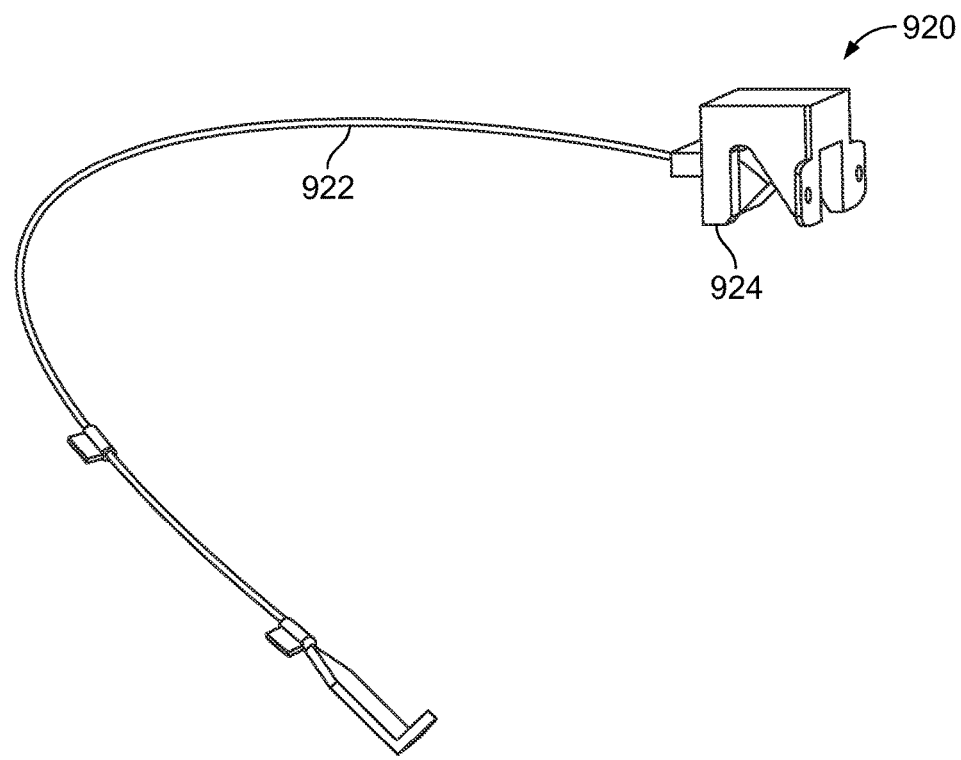
FIG. 9b is a diagrammatic representation of a front perspective view of another engagement portion of an engagement feature, in accordance with an exemplary embodiment.

FIGS. 9a-b illustrate example embodiments of latch mechanism that may be included in an example engagement feature. FIG. 9a illustrates an engagement portion 900 that includes cable 902 attached to latch 904. Latch 904 is coupled with an internal spring 906 that ensures that the latch 904 remains engaged when the cable 902 is not activated to release the latch. In this example, when the cable 902 is activated (e.g., pulled) to release the latch, the internal spring 906 may be compressed, and latch 904 may retract into the body of the engagement portion 900. An engagement rod engaged by latch 904 could then be released. In addition to (or, instead of) the engagement portion being configured to release the engagement rod using a cable pull system, the engagement portion 900 may also include a push button release 908. This push button release 908 may also be activated to release an engagement rod engaged by latch 904.

FIG. 9b illustrates an engagement portion 920 that includes cable 922 attached to latch 924. Latch 924 may include a pivot about which the latch 924 rotates. The latch 924 may include an internal spring that ensures that the latch remains engaged when the cable 922 is not activated to release the latch. In this example, when the cable 922 is activated to release the latch, the internal spring (e.g., torsion spring) and latch 924 may rotate about the pivot and thus retract into the body of the engagement portion 920. An engagement rod engaged by latch 924 could then be released. It should be understood that the latches of the engagement portions shown in FIGS. 9a-b are intended as examples only. Other types of latch mechanisms are possible as well.

The description of various embodiments has been presented for purposes of illustration and description, and is not intended to be exhaustive or limited to the embodiments in the form disclosed. Many modifications and variations will be apparent to those of ordinary skill in the art. Further, embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. A hidden latch system for an interior structure of an aircraft, the hidden latch system comprising:
at least two engagement features coupled to an interior structure of an aircraft, wherein each of the at least two engagement features comprises:
an engagement portion;
an engagement rod; and
a self-centering feature, wherein the engagement portion comprises a latch that is configured to engage and release the engagement rod, wherein the self-centering feature is configured to self-center the engagement rod in at least one direction, and wherein the latch is configured to release the engagement rod using a cable pull system,
wherein the at least two engagement features comprise a first engagement feature and a second engagement feature,
wherein, for the first engagement feature, the self-centering feature comprises frustoconically shaped portions at ends of a rod of the engagement rod, wherein when the engagement rod is moved toward engagement with the engagement portion, the frustoconically shaped portions self-center the engagement rod during engagement to the engagement portion, positioning the engagement portion between the frustoconically shaped portions,
wherein, for the second engagement feature, the self-centering feature comprises a floating base that comprises at least one biasing member connected to a base of the engagement rod, wherein when the engagement rod is moved toward engagement with the engagement portion, the floating base allows the engagement rod to float relative to the engagement portion thereby self-centering the engagement rod with the engagement portion, wherein the engagement rod is a substantially straight rod,
wherein, for each of the at least two engagement features, the self-centering feature further comprises a cut-out in the engagement portion configured to receive the engagement rod, and wherein the cut-out comprises a slanted portion that self-centers the engagement rod when the engagement rod is moved toward engagement with the engagement portion.

2. The hidden latch system of claim 1, wherein the interior structure comprises a ceiling panel.

3. The hidden latch system of claim 1, wherein the engagement rod of the second engagement feature has a length greater than a width of the engagement portion.

4. The hidden latch system of claim 1, wherein each of the at least two engagement features further comprises the floating base connected to (i) the engagement rod and (ii) the interior structure.

5. The hidden latch system of claim 4, wherein the floating base is configured to allow movement of the interior structure, relative to the engagement rod.

6. The hidden latch system of claim 5, wherein the floating base comprises at least one spring that allows the movement of the interior structure relative to the engagement portion in a given direction.

7. The hidden latch system of claim 1, wherein the cable pull system comprises a cable coupled to the latch.

8. The hidden latch system of claim 7, wherein the cable comprises a sheath-covered cable, and wherein a sheath of the sheath-covered cable is fixed at both a first end of the sheath and a second end of the sheath.

9. The hidden latch system of claim 7, wherein the cable is routed from the engagement feature to a remote location at least one foot away from the engagement feature.

10. The hidden latch system of claim 1, wherein each of the at least two engagement features further comprises a push button release.

11. A hidden latch for an interior structure of an aircraft, the hidden latch comprising:
an engagement feature coupled to an interior structure of an aircraft, wherein the engagement feature comprises:
an engagement portion;
an engagement rod; and
a self-centering feature, wherein the engagement portion comprises a latch that is configured to engage and release the engagement rod, wherein the self-centering feature is configured to self-center the engagement rod in at least one direction, and wherein the latch is configured to release the engagement rod using a cable pull system,
wherein the self-centering feature comprises a floating base that comprises at least one biasing member connected to a base of the engagement rod, wherein when the engagement rod is moved toward engagement with the engagement portion, the floating base allows the engagement rod to float relative to the engagement portion thereby self-centering the engagement rod with the engagement portion, wherein the engagement rod is a substantially straight rod.

12. The hidden latch of claim 11, wherein the floating base is configured to allow movement, relative to the engagement feature, of the interior structure.

13. The hidden latch of claim 11, wherein the cable pull system comprises a cable coupled to the latch.

14. The hidden latch system of claim 13, wherein the cable comprises a sheath-covered cable.

15. The hidden latch system of claim 14, wherein a sheath of the sheath-covered cable is fixed at both a first end of the sheath and a second end of the sheath.

16. The hidden latch system of claim 13, wherein the cable is routed from the engagement feature to a remote location at least one foot away from the engagement feature.

17. The hidden latch system of claim 11, wherein the interior structure comprises a ceiling panel.

18. The hidden latch system of claim 11, wherein the floating base comprises at least one spring that allows the movement of the interior structure relative to the engagement portion in a given direction.

19. The hidden latch system of claim 11, wherein the engagement feature further comprises a push button release.

20. The hidden latch system of claim 11, wherein the engagement rod has a length greater than a width of the engagement portion.

* * * * *